(12) United States Patent
Berg, Sr. et al.

(10) Patent No.: US 6,551,024 B1
(45) Date of Patent: Apr. 22, 2003

(54) SYSTEM AND METHOD FOR DETECTING LEAKS IN UNDERGROUND STORAGE TANK

(75) Inventors: Robin L. Berg, Sr., Hudson, WI (US); John Burwell, Eagan, MN (US); Richard J. Kelber, St. Louis Park, MN (US)

(73) Assignee: Xerxes Corporation, Minneapolis, MN (US)

(*) Notice: Subject to any disclaimer, the term of this patent is extended or adjusted under 35 U.S.C. 154(b) by 0 days.

(21) Appl. No.: 09/657,225

(22) Filed: Sep. 7, 2000

(51) Int. Cl.$^7$ .............................. B65G 5/00; G01M 3/04
(52) U.S. Cl. ........................ 405/54; 405/52; 405/53; 73/49.2; 220/560.03; 220/567.1
(58) Field of Search .................. 405/52–59; 220/560.01, 220/560.03, 560.1, 567.1; 73/49.2, 52

(56) References Cited

U.S. PATENT DOCUMENTS

| | | | |
|---|---|---|---|
| 1,954,581 A | * 4/1934 | Wortmann | 405/54 X |
| 4,561,292 A | * 12/1985 | Pugnale et al. | 220/560.03 X |
| 4,739,659 A | 4/1988 | Sharp | |
| 4,781,777 A | * 11/1988 | Pugnale et al. | 220/560.03 X |
| 4,813,285 A | * 3/1989 | Brown et al. | 73/49.2 |
| 4,875,361 A | 10/1989 | Sharp | |
| 4,925,046 A | 5/1990 | Sharp | |
| 4,948,007 A | 8/1990 | Berg et al. | |
| 4,958,957 A | 9/1990 | Berg et al. | |
| 4,974,739 A | 12/1990 | Gelin | |
| 4,989,447 A | * 2/1991 | Gelin | 73/49.2 |
| 5,017,044 A | 5/1991 | Sharp | |
| 5,020,358 A | 6/1991 | Sharp | |
| 5,072,623 A | * 12/1991 | Hendershot | 220/560.03 X |
| 5,220,823 A | 6/1993 | Berg et al. | |
| 5,505,329 A | * 4/1996 | Kauffman | 220/62.11 |
| 5,589,631 A | * 12/1996 | Spring et al. | 73/49.2 |
| 5,595,456 A | 1/1997 | Berg et al. | |
| 5,597,948 A | * 1/1997 | Sharp | 73/49.2 |
| 5,695,089 A | * 12/1997 | Reese et al. | 220/560.03 |
| 5,720,404 A | 2/1998 | Berg et al. | |
| 5,803,304 A | 9/1998 | Berg | |

FOREIGN PATENT DOCUMENTS

| | | | |
|---|---|---|---|
| EP | 536987 | * 4/1993 | 73/49.2 |

* cited by examiner

*Primary Examiner*—Jong-Suk (James) Lee
(74) *Attorney, Agent, or Firm*—Piper Rudnick, LLP; Steven B. Kelber

(57) ABSTRACT

A double walled storage tank includes an outer wall, an inner wall, a plurality of ribs disposed between the inner and outer walls, and a plurality of annular spaces between the ribs. The annular space between each pair of ribs is connected to other annular spaces only at the top of the tank. When a leak occurs in either the outer or inner wall, the annular space corresponding to the leak will at least partially drain while the other annular spaces will remain full. Thus, the leak location can be determined by simply examining the annular spaces between pairs of ribs.

15 Claims, 5 Drawing Sheets

SYSTEM AND METHOD FOR DETECTING LEAKS IN UNDERGROUND STORAGE TANK

BACKGROUND OF THE INVENTION

1. Field of the Invention

This invention pertains to tanks or containers for storing liquids. Specifically, the invention refers to double-wall underground storage tanks.

2. Related Art

Underground storage tanks are commonly used to store liquids such as gasoline and other petroleum products. Underground storage tanks are commonly manufactured using steel or fiber reinforced plastic (FRP). There are problems associated with tanks manufactured with both of these materials. Steel tanks rust and pit. FRP tanks may crack if improperly installed. When environmentally harmful materials such as petroleum products are stored in these tanks, leaks are of great concern. This concern has led some governmental authorities throughout the world, including the U.S. and Canada, to pass legislation requiring the use of double-walled tanks, which provide secondary containment.

A typical double walled tank 100 is shown in FIG. 1. The tank 100 includes an outer wall 10 and an inner wall 20. The outer wall 10 and the inner wall 20 are in a closely spaced adjacent relationship to form an annular space 30 between the outer and inner walls 10, 20. The outer and inner walls 10, 20 are cylindrical in the central portion of the tank 100. The annular space 30 is air-tight and liquid-tight. A monitoring tube 40, which is in fluid communication with the annular space 30, extends to the surface so that the annular space 30 may be monitored. Located between the outer wall 10 and the inner wall 20 are a plurality of reinforcing ribs 50. The reinforcing ribs 50 are attached to both the outer wall 10 and the inner wall 20. The reinforcing ribs 50 provide structural support for the tank 100. A hollow tube 60 passes through each rib 50 at both the top and bottom (and other locations if desired) of the tank 100. The hollow tube 60 ensures that the spaces between each of the ribs 50 are in fluid communication with each other to form a continuous annular space 30.

The annular space 30 is monitored to detect leaks in the outer wall 10 and the inner wall 20. Several different schemes may be used to monitor the annular space 30, including wet, dry, pressure and vacuum. Such schemes are well known in the art. Wet alarm systems are the most common. In a wet alarm system, the annular space 30 is filled with a leak detection fluid such as brine. In such a system, the brine fills the annular space 30 and a portion of the monitoring tube 40. If a leak occurs in the outer wall 10 or the inner wall 20, the level of fluid in the monitoring tube 40 will drop. Thus, leaks can be detected by monitoring the level of the fluid in the monitoring tube 40.

Known alarm systems, such as the wet alarm system described above, are adequate for detecting the presence of leaks. However, such alarm systems do not indicate the location of a leak. If the tank 100 does not have a manway, or a leak occurs in the outer wall 10, it may be necessary to dig up and expose the entire tank 100 to determine the location of the leak. This process is expensive and time consuming. Great savings could be realized if it were possible to identify the location of the leak without the need to remove the tank from the ground. Knowing the location of the leak would allow the leak to be repaired without incurring the costs associated with exposing the entire tank.

What is needed is a double-walled, underground storage tank that can detect both the presence and location of a leak.

SUMMARY OF THE INVENTION

The aforementioned need is met to a great extent by the present invention which provides a ribbed, double walled storage tank with a plurality of annular spaces between the ribs. The annular space between each pair of ribs is connected to other annular spaces only at the top of the tank. By connecting the annular spaces between the ribs only at the top and pitching the tank as described above, the tank will fill one annular space at a time in a cascading fashion. When a leak occurs in either the outer or inner wall, the fluid in the annular space corresponding to the leak will partially drain to the level of the leak while the other annular spaces will remain nearly full. Thus, the leak location can be determined by simply examining the annular spaces between pairs of ribs, starting at the lowest pair and working up, to detect the first annular space that is not nearly filled with leak detection fluid. The leak will be located between the pair of ribs corresponding to that annular space.

Examining the annular spaces may be accomplished in several different ways. A first preferred way to locate the location of the leak begins by gaining access to the interior of the tank. This may be accomplished through an existing manway, or may require cutting a hole in the tank, which is sometimes done through the top of the tank and sometimes done through an endwall or dome. (The tank is normally pumped out, cleaned and the air in the tank tested for safety prior to entering the tank). Once someone is in the tank, the annular space is filled (or refilled) to the extent possible with monitoring fluid. A leak in an inner wall should be visually detectable. If the leak is in an outer wall, one simply taps on the inside of the tank between each pair of ribs until a hollow section is found. The leak is then known to be on one side or the other between the rib pair, and at a height corresponding to the level to which the monitoring fluid has fallen. One way to determine the correct side is to add pressurized air to the annular space and listen for air escaping the outer wall. Of course, one could simply guess as to one side as well, with the knowledge that the other side will also require repairing if the guess is wrong. The inside wall is then cut away, preferably in a section approximately one foot wide, centered at the suspected height of the leak and extending across the rib pair. The break in the outer wall is then located and repaired. Then the inner wall and any hole made in order to gain access to the inside of the tank are repaired and the tank is ready for further use.

A second way to locate the leak is to expose the top of the tank and tap on it to locate the hollow annular space between a pair of ribs corresponding to the leak. This method locates the leak between one pair of ribs. Then the tank is exposed only between that pair of ribs and a process that is the analogue of the first (repair from inside) method is employed.

A third way is to provide a separate alarm at or near the top of each annular space, which also has the benefit of allowing the approximate location of the leak to be detected without exposing any portion of the tank. The method may be used with any type of alarm system. For example, with a wet alarm system, the leak detection fluid is already present and detecting the leak location is performed as described above. For dry types of systems in which the annular space is normally not filled with leak detection fluid, fluid can be introduced after the leak has been detected.

BRIEF DESCRIPTION OF THE DRAWINGS

The foregoing and other features and advantages of the invention will be more readily understood with reference to the following drawings in which.

DETAILED DESCRIPTION

The present invention will be discussed with reference to preferred embodiments of a double-walled underground storage tank. Specific details, such as the number of ribs, materials, and dimensions of the tank are set forth in order to provide a thorough understanding of the present invention. The preferred embodiments discussed herein should not be understood to limit the invention.

Figure 1:
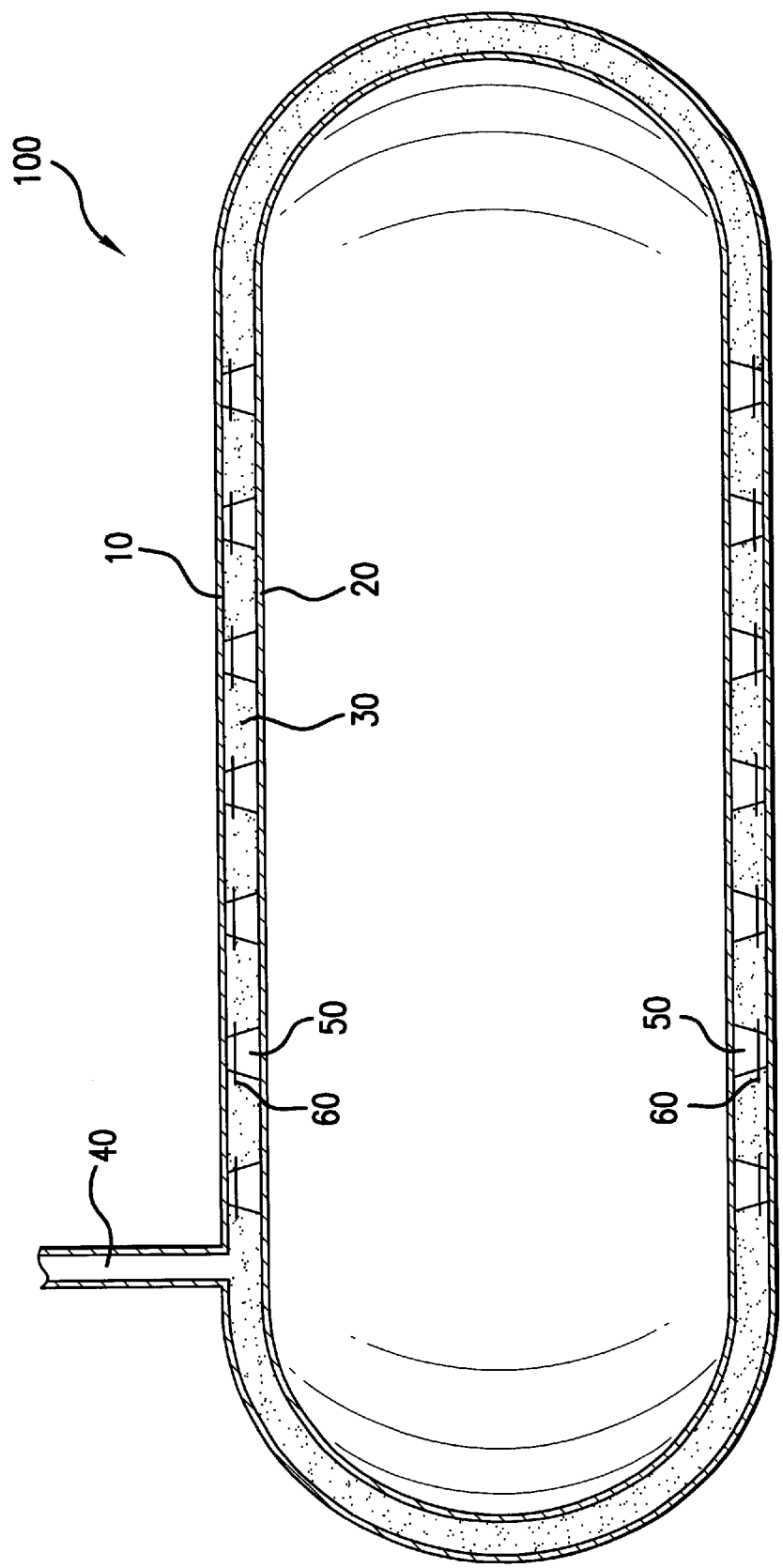
FIG. 1 is a cross sectional view of a prior art underground storage tank.
Figure 2:
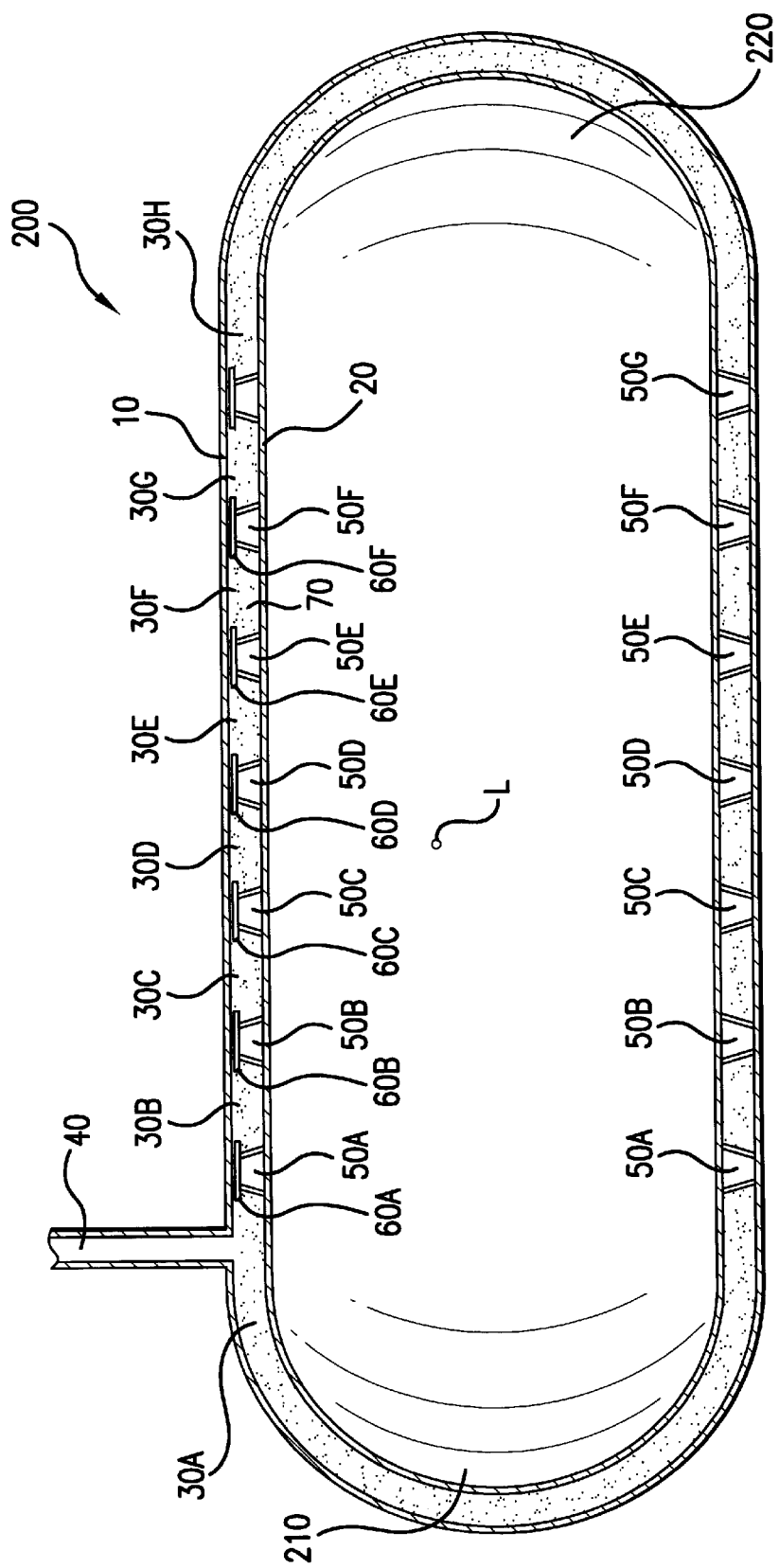
FIG. 2 is a cross sectional view of an underground storage tank according to one embodiment of the present invention.

FIG. 2 illustrates a storage tank 200 with an outer wall 10, an inner wall 20, and a plurality of ribs 50A–G. The outer and inner walls 10, 20 are cylindrical in the center portion of the tank 200. The ribs 50A–G are connected to both the inner wall 10 and the outer wall 20 such that a plurality of annular spaces 30A–H are formed. Each of the annular spaces are in fluid communication with each other only at the top of the tank 200 through passages in the form of tubes 60A–G passing through the ribs 50A–G. The annular spaces 30 may be empty or may be filled by a porous, load-transmitting material such as Parabeam™, plastic webbing, or other material as described in U.S. Pat. No. 5,220,823. A monitoring tube 40 is provided at one end of the tank 200. The monitoring tube 40 is used to introduce leak detection fluid into the annular spaces 30A–H and to monitor the annular spaces 30A–H for leaks.

In FIG. 2, each tube 60 is located as close to the top of a corresponding rib 50 as is practicable. Although only a single tube 60 is shown in FIG. 2, it will be apparent to those of skill in the art that more than one tube 60 may be used for each rib 50. It is not the number of tubes 60 that is important, it is their location—the tubes 60 should be located near the top of the tank. It should also be noted that the shape of the tube 60 is unimportant. Furthermore, the use of a tube 60 is not required—any passage (such as a simple bore) through the rib 50 through which fluids will pass is sufficient.

The tank 200 is installed with or without a slight pitch. The tank 200 will fill in a cascading fashion when fluid is introduced into the annular spaces 30A–H from the monitoring tube 40. That is, liquid introduced into the annular spaces 30 will fill (the annular spaces 30 will actually fill only to the level of the tubes 60—topping off will be necessary at the end of the filling process) annular space 30A first while all other annular spaces 30B–H remain empty. When annular space 30A is full, fluid will pass through the tube 60A into annular space 30B, which will then fill before the remaining annular spaces 30C–H begin to fill. Fluid will continue to fill the annular spaces 30 one at a time in this cascading fashion until all annular spaces 30A–H are filled (assuming there is no leak present).

The location of the tubes 60 at the top of the ribs 50 also ensures that leak detection fluid will drain from only one annular space 30 in the event of a leak. For example, if a leak occurs at location L along the outer wall 10, the leak detection fluid in annular space 30D will drop to the level of the leak L. This can be seen with reference to FIG. 3.

Figure 3:
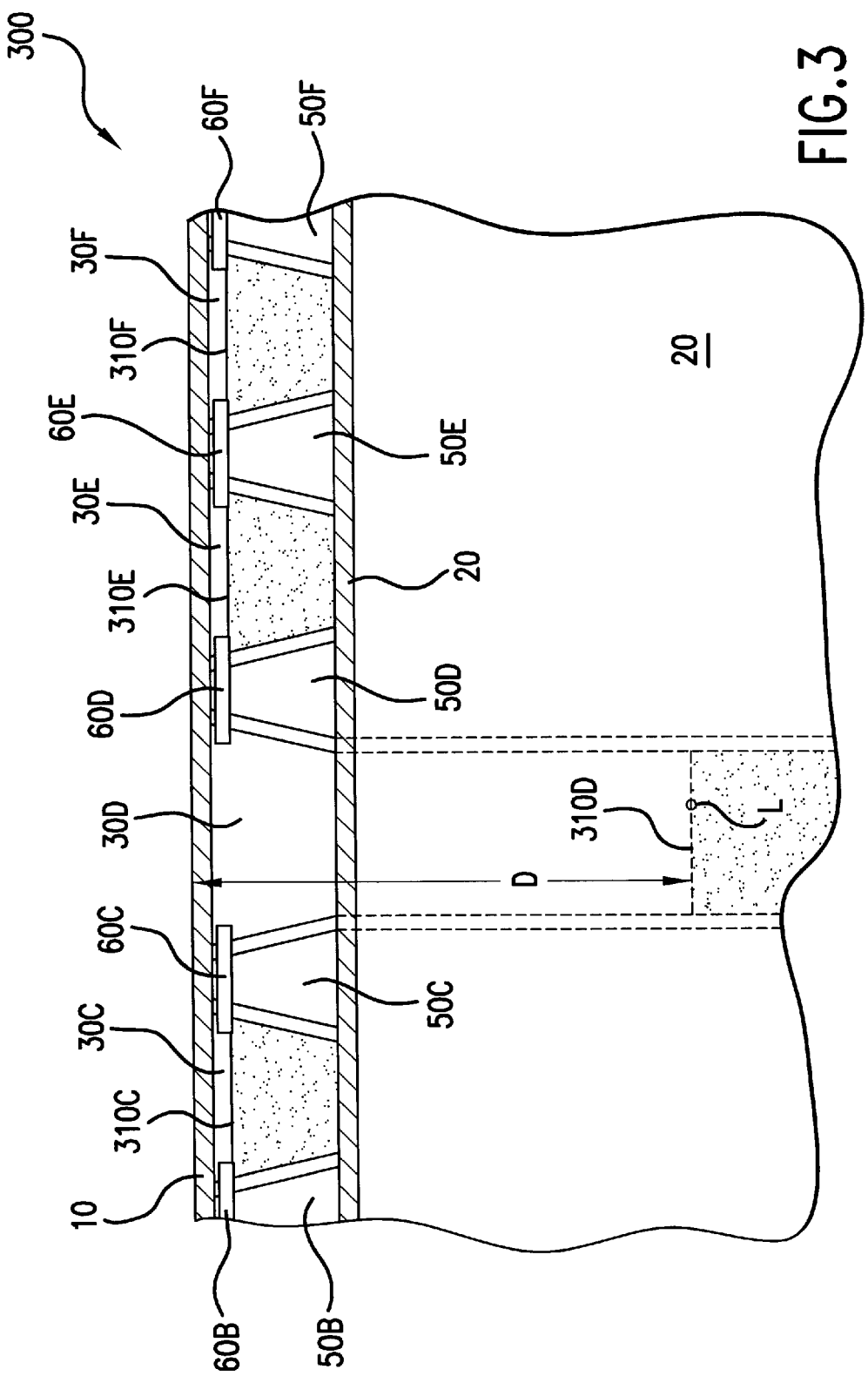
FIG. 3 is a cross-sectional view of a portion of the tank of FIG. 2.

FIG. 3 illustrates a cut-away portion 300 of the tank 200 with a leak at location L in annular space 30D. The water level 310 in each of the non-leaking annular spaces 30A–C and 30E–H will drain only a small amount to a level just below the tube 60 in each annular space 30. Because the tank 200 is cylindrical and the tubes 60 are at the top of the tank 200, the annular spaces 30A–C;E–H will remain almost completely full. However, the annular space 30D (the edges of the annular space 30 formed by the ribs 50C and 50D are shown in phantom in FIG. 3) will empty to a level D corresponding to the location of the leak.

Figure 4:
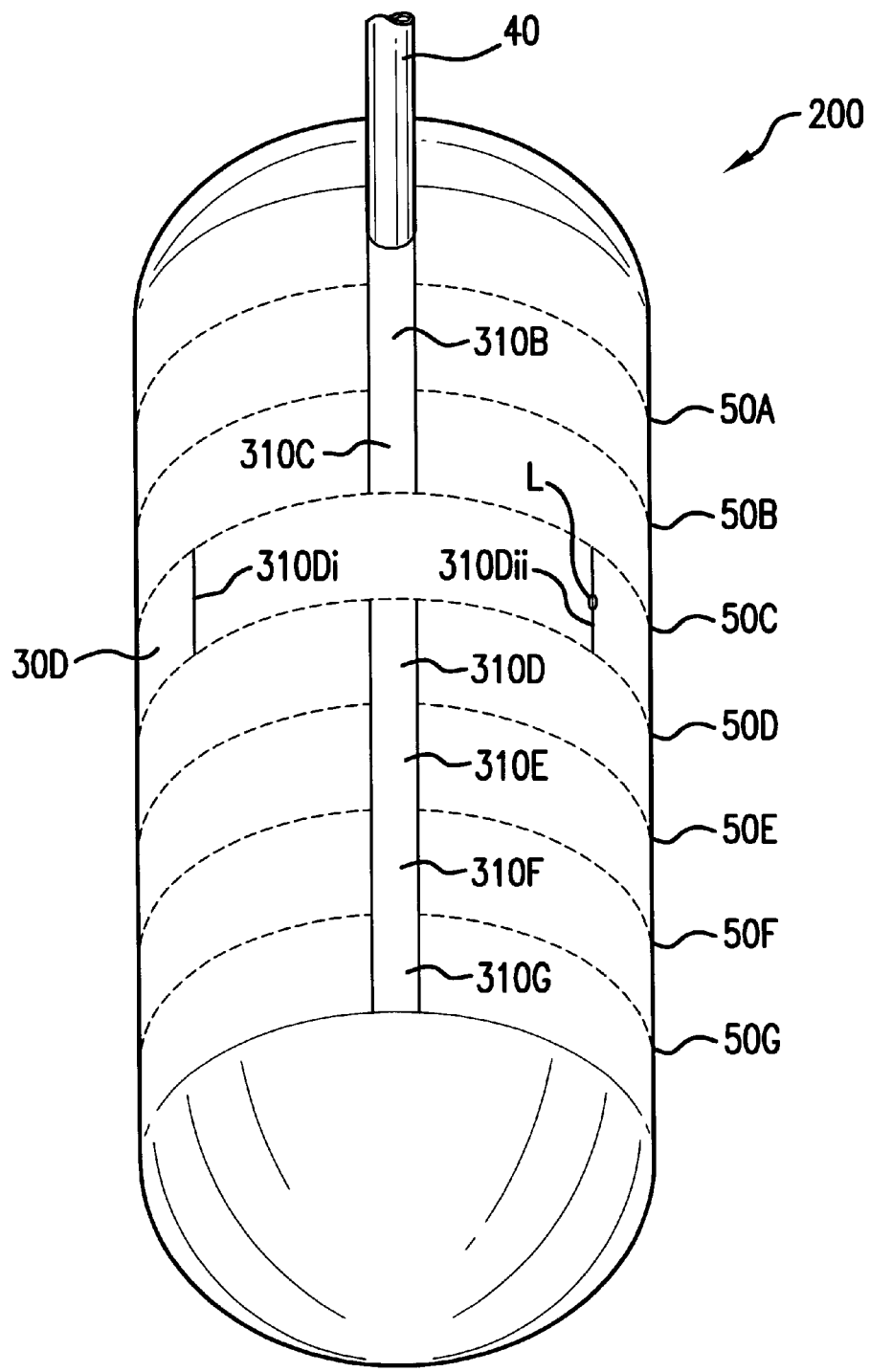
FIG. 4 is a perspective view of the tank of FIG. 2.

The resultant fluid levels can be more easily visualized with reference to FIG. 4. FIG. 4 shows the fluid levels 310 in each of the annular spaces 30 when viewed from the top of the tank 200. As discussed above, the fluid levels 310 in the non-leaking annular spaces 30 are nearly at the top. In contrast, the fluid level 310D at annular space 30D is reduced to the level of the leak L.

Determining the location of the leak in a wet alarm system will again be discussed with reference to FIG. 4. As discussed above, once a leak occurs, the leak detection fluid level in the monitoring tube 40 will fall, signaling a leak in either the outer wall 10 or the inner wall 20. The leak location can be determined in a number of ways. A first method involves entering the tank 200, which can be accomplished by cutting a hole in the tank 200 if there is no manway. The tank is preferably emptied and cleaned prior to entrance. Once inside the tank 200, one simply taps on the inside wall on the top of the tank 200 between successive rib pairs until a hollow sound indicating an empty annular space 30 is detected. This places the location of the leak somewhere between the rib pair and in either the inner or outer wall. Next, one taps on the inner wall starting at the top and working down between the rib pair until the level of the leak detection fluid is determined (the hollow sound will cease once the fluid level is reached). This determines the distance D (with reference to FIG. 3) from the top of the tank to the leak. At this point, it is known that the leak exists between the rib pair, and the approximate height of the leak is known. Next, additional leak detection fluid is added to the fill tube 40 so that any leak on the inside wall will be visible. If no leak is detected, it is known that the leak is on the outside wall of the tank on one side or the other. At this point, pressurized air may be introduced to the annular space via the monitoring tube 40. It may be possible to hear (possibly with the aid of a stethoscope) the air escaping through the outside wall using this technique. If the leak cannot be located in this manner, or if pressurized air is not available, then one may simply guess as to which side of the outer wall is leaking. One then cuts away a portion of the inner wall to gain access to the outer wall and repair it as needed. If the guess was wrong, then the leak is on the other side of the tank and is repaired accordingly.

A second way the leak location may be determined is by exposing the top of the tank 200 and examining it from the outside between successive pairs of ribs until a non-full (as can be seen from FIG. 3, a full annular space is actually nearly full, as a small amount of leak detection fluid will escape through the tube 60) annular space 30 is encountered. This examination may be carried out in a number of different ways. First, the top of the tank 200 may include non-opaque portions (such as clear windows or a clear strip) so that the fluid level may be observed visually. Second, the top of the tank may be struck or tapped until a hollow sound (indicating a non-full annular space 30) is detected. Third, individual sensors 70 may be placed in each of the annular spaces 30A–H. Other examination methods are also possible.

In the example shown in FIG. 4, the fluid level indicates that the leak has occurred in annular space 30D. If the examination were carried out by exposing and tapping on successive portions of the top of the tank 200, only approximately one-half of the top of the tank 200 need be exposed to locate the leak. Once the annular portion 30D corresponding to the leak has been identified, the sides of the tank need only be exposed down to the fluid level 310Di. At this point, it is known that the leak must be at level 310Di between ribs 50C and 50D on one side of the tank 200. (310Di is the lower level and 310Dii is the top level of the detection fluid.) All that remains to be done is to identify which side the leak is on and whether the leak is in the inner or outer wall. This may be accomplished by using an analogue of the method for locating the leak from the inside of the tank described above.

In a dry leak detection system, one or more fluid detectors are placed in each of the annular spaces 30. If any one fluid detector is triggered, the leak corresponds to the respective annular space. More than one fluid detector could be placed in each of the annular spaces 30 to provide an approximate indication of the height of the leak.

As discussed above, the techniques above may be modified to work with vacuum or pressure leak detection systems as well. In a pressure system, the annular spaces 30 (which are all in fluid communication with each other) are pressurized with air or another gas. A drop or loss of pressure indicates a leak. In a vacuum alarm system, the annular spaces are partially evacuated. A loss of vacuum indicates the presence of a leak. When either of these systems indicates the presence of a leak, an amount of leak detection fluid sufficient to fill all of the annular spaces is introduced into the annular spaces through a monitoring tube at a slow enough rate such that only those annular spaces before the leak are filled and all other leak detection fluid escapes the annular spaces through the leak. The exact fill rate will depend upon the conditions outside the tank as well as the presence and type of material disposed within the annular spaces.

Figure 5:
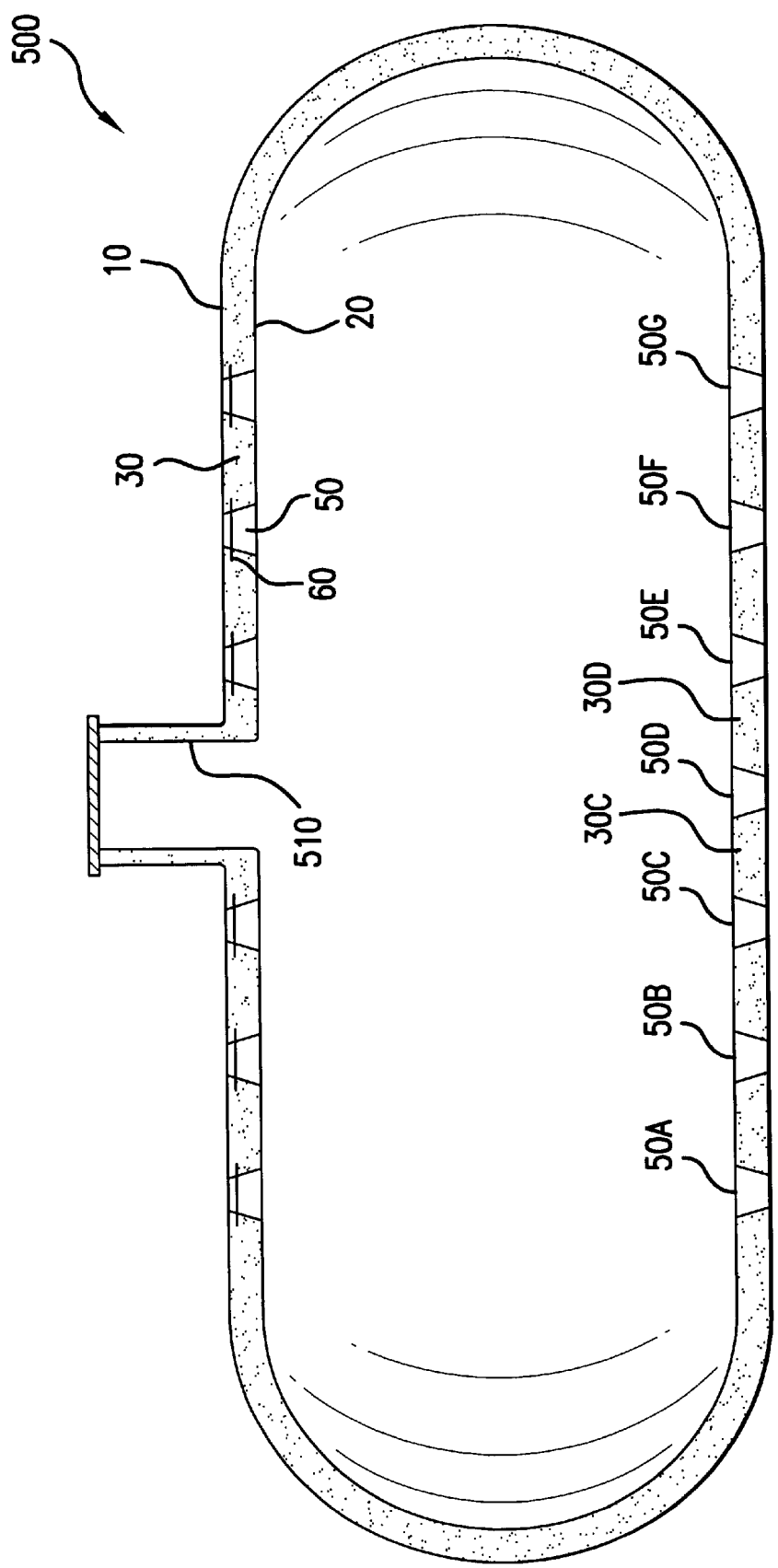
FIG. 5 is a cross sectional view of an underground storage tank according to a second embodiment of the present invention.

Although the tanks discussed above are generally cylindrical in shape, the same techniques could be employed with tanks of any shape, including spherical. It is also possible to build a tank 500 with a manway 510 as shown in FIG. 5. In such an embodiment, rib 50D may or may not separate annular spaces 30C and 30D due to the presence of the manway.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed is:

1. A double walled storage tank comprising:
    an inner wall;
    an outer wall in a closely spaced adjacent relationship thereto; and
    a plurality of ribs adjacent to the inner wall and the outer wall such that the ribs, the inner wall and the outer wall form a plurality of annular spaces, each of the ribs having at least one passage formed therethrough;
    wherein all of the passages are located at approximately a top of the tank and the annular spaces are filled with leak detection fluid and are in fluid communication only through the passages, so as to determine the approximate location of the leak in the annular spaces.

2. The tank according to claim 1, wherein each of the ribs has a plurality of passages therethrough.

3. The tank according to claim 1, wherein each of the ribs has a single passage therethrough.

4. The tank of claim 1, further comprising a monitoring tube in fluid communication with on of the annular spaces at an end of the tank.

5. The tank of claim 4, further comprising an alarm system for monitoring the level of fluid in the monitoring tube and sounding an alarm when the level changes by more than a preselected amount.

6. The tank of claim 1, wherein the ribs are attached to the inner wall and the outer wall.

7. The tank of claim 1, further comprising at least one sensor disposed within each of the annular spaces, the sensor being able to determine the presence of liquid in the annular space.

8. A method for determining the approximate location of a leak in an underground storage tank, the method comprising the steps of:
    providing an underground storage tank having an inner wall, an outer wall in a closely spaced adjacent relationship to the inner wall, and a plurality of ribs disposed between and adjacent to the inner and the outer wall such that a plurality of annular spaces are formed, each of the ribs having at least one passage therethrough, all of the passages being located at approximately a top of the tank, the tank having a monitoring tube in direct fluid communication with one of the annular spaces at an end of the tank;
    introducing an amount of leak detection fluid into the monitoring tube to fill all of the annular spaces;
    detecting a leak; and
    determining whether and which of at least one of the annular spaces is approximately filled with the leak detection fluid.

9. The method of claim 8, wherein the leak detection fluid is introduced before the leak is detected.

10. The method of claim 9, wherein the leak detection fluid is introduced before the tank is installed.

11. The method of claim 9, wherein the leak detection fluid is introduced after the tank is installed.

12. The method of claim 8, wherein the leak detection fluid is introduced after the leak is detected.

13. The method of claim 8, wherein the determining step is performed by exposing and tapping on successive portions of the top of the tank corresponding to the successive annular spaces, starting with the annular space in direct fluid communication with the monitoring tube.

14. The method of claim 8, wherein the top of the tank is examined by looking through non-opaque portions of the top of the tank to determine the leak detection fluid level.

15. The method of claim 8, wherein the determining step is performed by examining sensors associated with each of the annular spaces that indicate the presence of leak detection fluids.

* * * * *